United States Patent
Kubota et al.

(10) Patent No.: US 8,011,271 B2
(45) Date of Patent: Sep. 6, 2011

(54) FRACTURE SPLIT-TYPE CONNECTING ROD, INTERNAL COMBUSTION ENGINE, TRANSPORTATION APPARATUS, AND PRODUCTION METHOD FOR FRACTURE SPLIT-TYPE CONNECTING ROD

(75) Inventors: Tsuyoshi Kubota, Shizuoka (JP); Hiroshi Yamagata, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 202 days.

(21) Appl. No.: 12/335,556

(22) Filed: Dec. 16, 2008

(65) Prior Publication Data

US 2009/0158887 A1 Jun. 25, 2009

(30) Foreign Application Priority Data

Dec. 25, 2007 (JP) ................. 2007-332243

(51) Int. Cl.
*F16C 7/02* (2006.01)
(52) U.S. Cl. ........................ 74/579 R
(58) Field of Classification Search .............. 74/579 R, 74/593, 594, 579 E; 72/254, 352
See application file for complete search history.

(56) References Cited

U.S. PATENT DOCUMENTS

| | | | | | |
|---|---|---|---|---|---|
| 4,975,125 | A | * | 12/1990 | Chakrabarti et al. | 148/407 |
| 5,849,112 | A | * | 12/1998 | El-Soudani | 148/421 |
| 6,961,997 | B2 | * | 11/2005 | Kubota et al. | 29/888.09 |
| 2003/0084970 | A1 | | 5/2003 | Ariyasu et al. | |
| 2006/0260433 | A1 | | 11/2006 | Kubota et al. | |

FOREIGN PATENT DOCUMENTS

| | | |
|---|---|---|
| EP | 0 254 891 | 2/1988 |
| EP | 0 919 315 A1 | 6/1999 |
| EP | 1 724 476 A2 | 11/2006 |
| JP | 60-247432 A | 12/1985 |
| JP | 63-259058 A | 10/1988 |
| JP | 02-213453 A | 8/1990 |
| JP | 09-182932 A | 7/1997 |
| JP | 2002-60873 A | 2/2002 |
| JP | 2005-320570 A | 11/2005 |
| JP | 2006-308027 A | 11/2006 |
| JP | 2007-3000 A | 1/2007 |

OTHER PUBLICATIONS

Official communication issued in counterpart European Application No. 08021595.7, mailed on Mar. 13, 2009.
Matsubara, "Development of Free Machining Titanium Alloy for Connecting Rods", Titanium Zirconium; Oct. 1991, vol. 39, No. 4: pp. 175-184.

* cited by examiner

Primary Examiner — Vicky Johnson
(74) Attorney, Agent, or Firm — Keating & Bennett, LLP

(57) ABSTRACT

A connecting rod is a fracture split-type connecting rod made of an α+β type titanium alloy, including a rod main body and a big end provided at an end of the rod main body, the big end being fracture-split. The structure of the rod main body is an equiaxed α structure, and the structure of fractured surfaces of the big end is an acicular α structure.

5 Claims, 12 Drawing Sheets

FIG.4
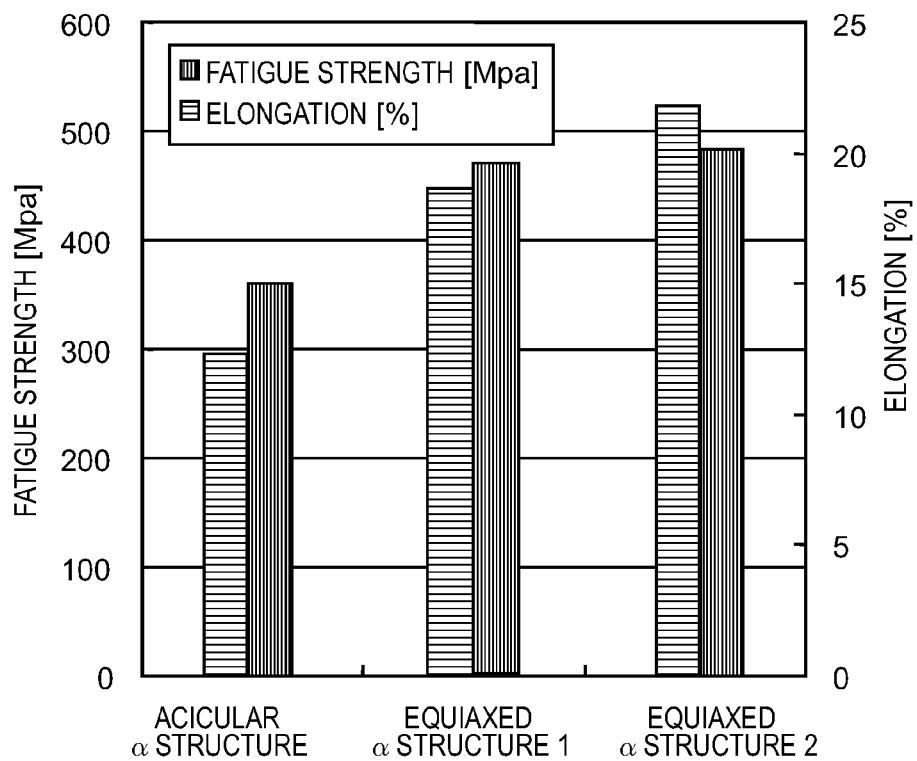
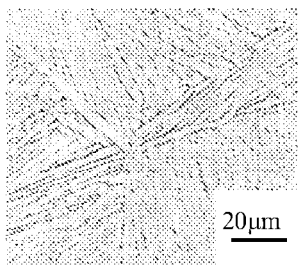
FIG.5A
ACICULAR α STRUCTURE
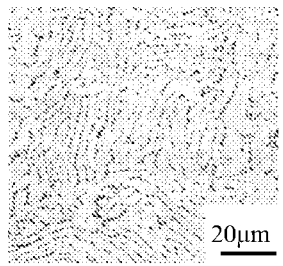
FIG.5B
EQUIAXED α STRUCTURE 1
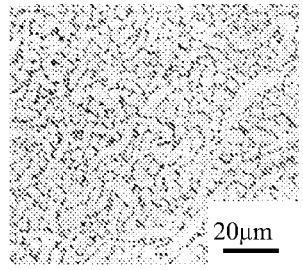
FIG.5C
EQUIAXED α STRUCTURE 2

FIG.6
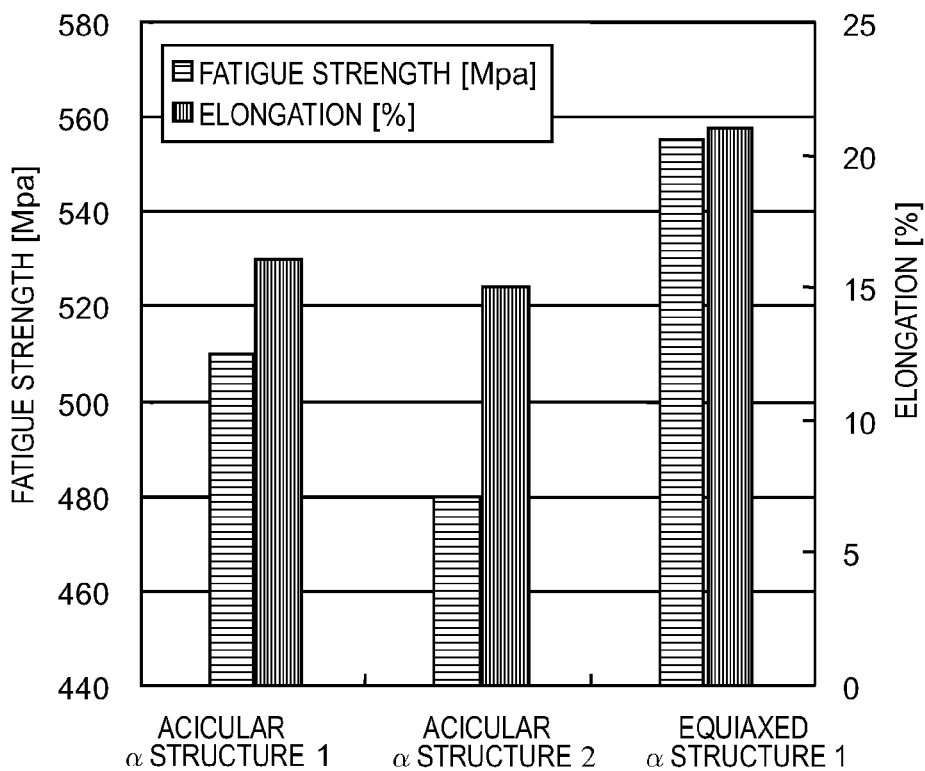
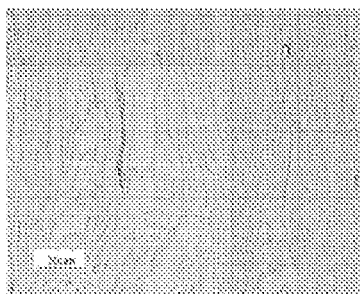
ACICULAR α STRUCTURE 1
FIG.7A
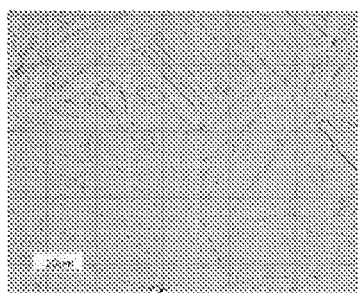
ACICULAR α STRUCTURE 2
FIG.7B
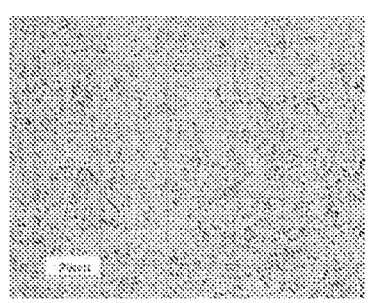
EQUIAXED α STRUCTURE
FIG.7C

METAL FLOW LINE

35

DIRECTION OF EXTRUSION

FRACTURE SPLIT-TYPE CONNECTING ROD, INTERNAL COMBUSTION ENGINE, TRANSPORTATION APPARATUS, AND PRODUCTION METHOD FOR FRACTURE SPLIT-TYPE CONNECTING ROD

BACKGROUND OF THE INVENTION

1. Field of the Invention

The present invention relates to a fracture split-type connecting rod and a production method thereof, and more particularly to a fracture split-type connecting rod of a titanium alloy and a production method thereof. Moreover, the present invention also relates to an internal combustion engine and a transportation apparatus having such a fracture split-type connecting rod.

2. Description of the Related Art

In an internal combustion engine of an automotive vehicle, a part which is called a connecting rod (or con rod) is used for linking a crankshaft to a piston. FIG. 14 shows a conventional connecting rod 401. The connecting rod 401 includes a bar-like rod main body 410, a small end 420 which is provided at one end of the rod main body 410, and a big end 430 which is provided at the other end of the rod main body 410.

The small end 420, which has a throughhole 425 for allowing a piston pin to extend therethrough, is connected to a piston. On the other hand, the big end 430, which has a throughhole 435 for allowing a crankpin to extend therethrough, is connected to a crankshaft.

The big end 430 is split into a rod portion 433 which continues from the rod main body 410, and a cap portion 434 which is coupled to the rod portion 433 with bolts 440. Therefore, the connecting rod 401 shown in FIG. 14 is referred to as a split-type connecting rod.

Conventionally, steel has widely been used as the material used for forming connecting rods. In recent years, use of a titanium alloy has been proposed in order to reduce the weight of the connecting rod. Examples of methods for producing a connecting rod by using a titanium alloy include occluded forging or closed forging as disclosed in Japanese Laid-Open Patent Publication No. 60-247432 and hot forging as disclosed in Toshihiko MATSUBARA, "Development of Free-Cutting Titanium Alloy Connecting Rods", Titanium·Zirconium, October 1991, Vol. 39, 4th issue, pp. 175-184.

When producing a split-type connecting rod by using such methods, it is possible to obtain an increased production yield with the material by forging an integral big end, i.e., such that the rod portion and the cap portion are formed as an integral piece. However, when forging is performed in this manner, the rod portion and the cap portion must of course be separated subsequently by machining. Even after separation, the abutting surfaces of the rod portion and the cap portion must be processed, and a processing for positioning must be performed in order for the rod portion and the cap portion to be attached with a good precision. Generally speaking, a titanium alloy is less suitable for machining than steel is. Therefore, such a series of processing steps may become a cause for deterioration in the productivity and an increase in the production cost of a connecting rod which is made from a titanium alloy.

As a technique for solving this problem, a fracture technique has been proposed. The fracture technique is a technique which, after forming an integral big end, splits the big end into a rod portion and a cap portion by way of brittle fracture. Through the brittle fracture, minute complementary rugged features will be left on the fractured surfaces of the rod portion and the cap portion. These fractured surfaces do not need to be subjected to any additional processing. Since the minute complementary rugged features formed on the fractured surfaces will allow a highly precise positioning when the rod portion and the cap portion are attached, there is no need to perform a processing for forming any positioning structure.

This fracture technique has often been practiced for forming connecting rods using a steel material such as sintered steel, carbon steel, microalloyed steel, or carburized steel. However, the fracture technique has scarcely been used for forming connecting rods made of titanium alloys, and is basically considered unable to be used for forming connecting rods made of titanium alloys. The reason is that a titanium alloy has a high toughness, which makes it extremely difficult to perform a fracture technique—which requires brittle fracture—for forming a connecting rod of a titanium alloy.

There is another reason which makes it difficult to fracture-split a connecting rod of a titanium alloy, such as follows. Conventionally, a connecting rod of a titanium alloy is produced by first shaping a bulk titanium alloy into a plate or bar form by plastic processing, and then either punching or cutting out a connecting rod from the plate or bar-like member. Alternatively, connecting rods made of titanium alloys have been produced by applying forging to a rough-shaped material which is already in a bar, plate, or other form, and subjecting the forged product to finish machining.

In doing so, for ease of mold design and improvement in mechanical strength and production yield, as shown in FIG. 15, a design has been adopted in which metal flow lines (also called fiber flow lines) of a titanium alloy composing the connecting rod are parallel to the longitudinal direction of the connecting rod. A metal flow line is a flow of metallographical structure found in a forged product, and is also called a flow line. When a cutting plane of a forged product is allowed to corrode, metal flow lines will be visually recognized as fibrous metallographical structures. FIG. 15 schematically shows metal flow lines with solid lines MF. In order to allow the big end of a connecting rod design as described above to be fracture-split, a brittle fracture must occur across the metal flow lines, i.e., so as to cut through the fibrous metallographical structures. It is difficult to achieve such a brittle fracture in a connecting rod of a titanium alloy having a high toughness.

In Japanese Laid-Open Patent Publication No. 9-182932, as a technique of facilitating the fracture split of a connecting rod which is formed by roll forging, a technique is disclosed where the metal flow lines are aligned perpendicular to the longitudinal direction of the connecting rod, as shown in FIG. 16. Japanese Laid-Open Patent Publication No. 9-182932 describes that this technique enables a fracture which does not run across the metal flow lines, thus facilitating the fracture split. Although Japanese Laid-Open Patent Publication No. 9-182932 generally provides descriptions concerning steel connecting rods, it also adds that the technique can be used for a connecting rod of an aluminum alloy or a titanium alloy.

However, in a connecting rod of a titanium alloy, the elongation (one of the tensile characteristics of a metal material) of the titanium alloy will exert a larger influence than the influence of the direction of metal flow lines. Therefore, a fracture split cannot be easily performed by merely prescribing the metal flow lines to run along a predetermined direction. In a conventional connecting rod of a titanium alloy, the titanium alloy has a large elongation, thus requiring a large energy when performing the fracture split. Moreover, due to the large elongation, the fractured surfaces will undergo a plastic deformation at the time of fracture split, whereby the reproducibility of the roundness of the big end inner diameter upon attachment to a crankshaft (referred to as "reassemblability") will be significantly lowered.

SUMMARY OF THE INVENTION

In view of the above problems, preferred embodiments of the present invention provide a connecting rod of a titanium alloy which is easily split by a fracture technique and which has an excellent reassemblability, as well as a production method thereof.

A connecting rod according to a preferred embodiment of the present invention is a fracture split-type connecting rod made of an α+β type titanium alloy, including: a rod main body; and a big end provided at an end of the rod main body, wherein, the big end is fracture-split; the rod main body has an equiaxed α structure; and fractured surfaces of the big end have an acicular α structure.

In a preferred embodiment, the big end has a throughhole; and metal flow lines in an area of the fractured surfaces of the big end are generally parallel to a center axis of the throughhole.

In a preferred embodiment, the big end has a thrust surface which comes in sliding contact with a crank arm; and the width of the thrust surface is broadest in the neighborhood of the fractured surfaces.

An internal combustion engine according to another preferred embodiment of the present invention includes a fracture split-type connecting rod having the above construction.

A transportation apparatus according to a further preferred embodiment of the present invention includes an internal combustion engine having the above construction.

A production method for a connecting rod according to an additional preferred embodiment of the present invention is a production method for a fracture split-type connecting rod having a rod main body and a big end provided at an end of the rod main body, the big end being fracture-split, the method including: a step (a) of providing a workpiece made of an α+β type titanium alloy; a step (b) of maintaining the workpiece at a temperature equal to or higher than a β transformation point; and a step (c) of, after the step (b), forging the workpiece at a temperature below the β transformation point, wherein, the step (c) is performed so that a portion corresponding to the rod main body has a forging ratio which is equal to or greater than about 2 and that a portion corresponding to an area of fractured surfaces of the big end has a forging ratio which is less than about 2.

In a preferred embodiment, in the step (b), the workpiece is subjected to a plastic processing while being maintained at a temperature equal to or higher than the β transformation point.

In a preferred embodiment, the step (b) includes a step (b-1) of extruding the workpiece at a temperature equal to or higher than the β transformation point; and in the step (b-1), the workpiece is molded so that an outer peripheral shape thereof as seen from a direction of extrusion is generally identical to an outer peripheral shape of the workpiece after being subjected to the forging at the step (c).

In a preferred embodiment, the production method for a fracture split-type connecting rod according to a preferred embodiment of the present invention further includes, between the step (b-1) and the step (c), a step (d) of cutting the extruded workpiece to a predetermined thickness.

A fracture split-type connecting rod according to a preferred embodiment of the present invention is made of an α+β type titanium alloy such that the α phase is deposited within the β phase, the β phase being a parent phase. Microstructures of an α+β type titanium alloy are generally classified into an equiaxed α structure which has a high fatigue strength and a large elongation; and an acicular α structure which has a low fatigue strength and a small elongation. In the fracture split-type connecting rod according to a preferred embodiment of the present invention, the structure of the rod main body is an equiaxed α structure, whereas the structure of the fractured surfaces of the big end is an acicular α structure. Therefore, while conserving a high fatigue strength of the rod main body, fracture split of the big end can be facilitated, and a high reassemblability can be realized.

A production method for a fracture split-type connecting rod according to a preferred embodiment of the present invention includes a step of maintaining a workpiece of an α+β type titanium alloy at a temperature equal to or higher than the β transformation point, and after this step, a step of subjecting the workpiece to a forging at a temperature below the β transformation point. By maintaining the workpiece at a temperature equal to or higher than the β transformation point, the structure of the entire workpiece temporarily becomes an acicular α structure. The subsequently-performed forging at a temperature below the β transformation point is carried out in such a manner that the portion corresponding to the rod main body has a forging ratio which is equal to or greater than 2 and that the portion corresponding to the area of the fractured surfaces of the big end has a forging ratio which is less than 2. As a result, the structure of the portion corresponding to the rod main body becomes an equiaxed α structure, while the structure of the portion corresponding to the neighborhood of the fractured surfaces remains as an acicular α structure. Therefore, according to the production method of a preferred embodiment of the present invention, a connecting rod can be produced in which the structure of the rod main body has an equiaxed α structure and the structure of the fractured surfaces of the big end is an acicular α structure.

According to various preferred embodiments of the present invention, there is provided a fracture split-type connecting rod made of a titanium alloy, which is easily split by a fracture technique and which has an excellent reassemblability; and a production method thereof.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4 is a graph showing a relationship between microstructure types of an α+β type titanium alloy, fatigue strength (MPa), and elongation (%).

FIGS. 5A to 5C are photographs showing the microstructures of an α+β type titanium alloy.

FIG. 6 is a graph showing a relationship between microstructure types of an α+β type titanium alloy, fatigue strength (MPa), and elongation (%).

FIGS. 7A to 7C are photographs showing microstructures of an α+β type titanium alloy.

DETAILED DESCRIPTION OF THE PREFERRED EMBODIMENTS

Figure 1:
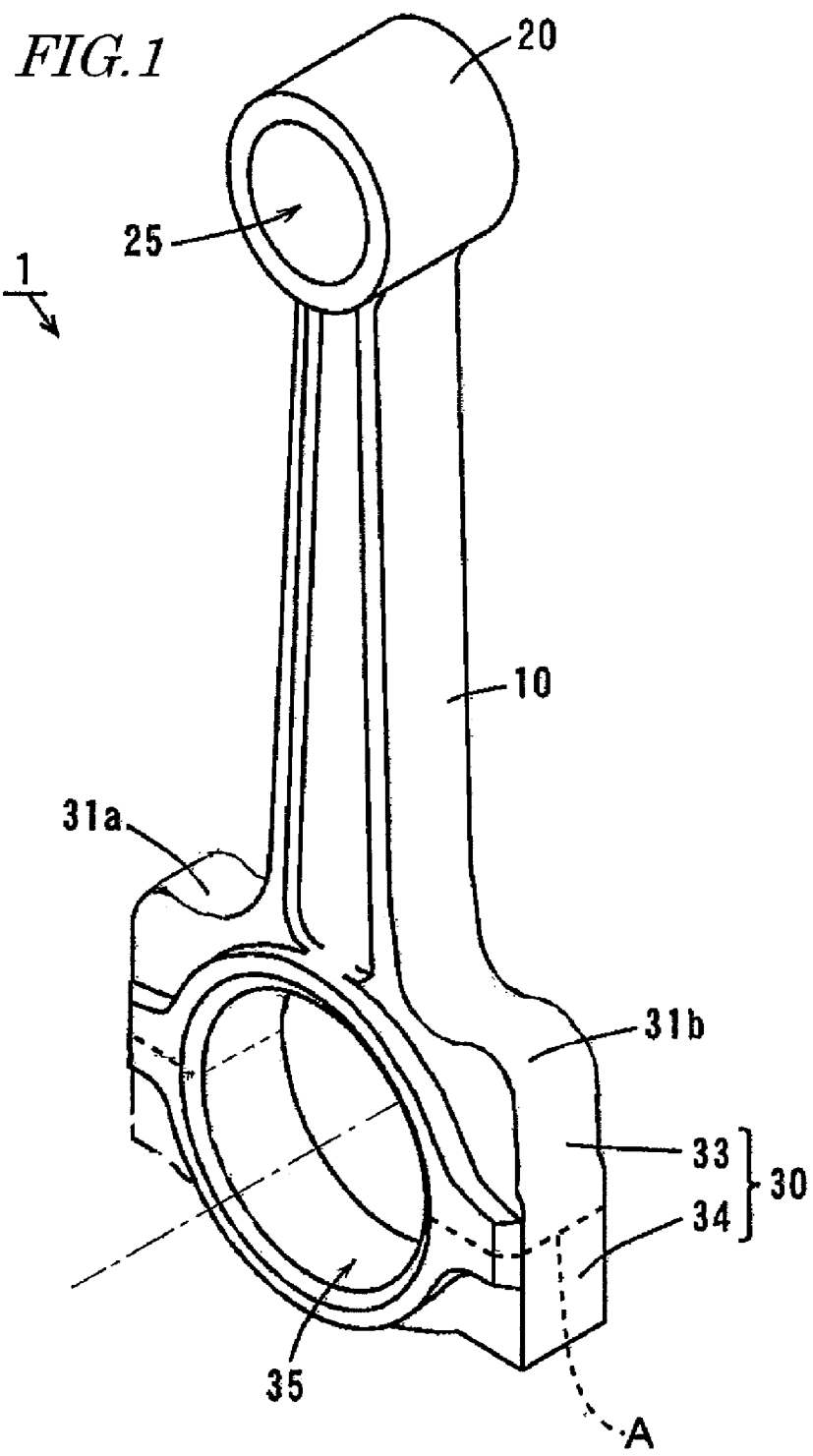
FIG. 1 is a perspective view which schematically shows a connecting rod according to a preferred embodiment of the present invention before undergoing a fracture split.

The inventors have conducted various studies for facilitating a fracture split of a connecting rod of a titanium alloy and improving the reassemblability thereof. In doing so, the inventors have paid attention to the characteristics of various microstructures of the titanium alloy.

Titanium alloys are generally classified into three types, i.e., the $\alpha$ type, the $\alpha+\beta$ type, and the $\beta$ type, depending on their microstructures at room temperature. In various preferred embodiments of the present invention, an $\alpha+\beta$ type titanium alloy is preferably used as the material of a connecting rod. An $\alpha+\beta$ type titanium alloy is a titanium alloy which is neither the $\alpha$ phase alone nor the $\beta$ phase alone at room temperature (20° C.) (that is, both the a phase and the $\beta$ phase are diversely present), and which becomes the $\beta$ phase alone at a certain temperature which is higher than room temperature. In order to confer such a property to a titanium alloy (i.e., so that the titanium alloy becomes an $\alpha+\beta$ type), the amounts of a $\beta$-stabilizing element (specifically, V, Mo, Cr, Mn, Fe, etc.) and an a-stabilizing element (specifically, Al, O, N, etc.) to be added are adjusted. The temperature at which the $\alpha+\beta$ type titanium alloy becomes the $\beta$ phase alone is referred to as the "$\beta$ transformation point".

The structure of an $\alpha+\beta$ type titanium alloy is classified into an equiaxed $\alpha$ structure and an acicular $\alpha$ structure, depending on the shape of the $\alpha$ phase that is present within the structure (i.e., that is deposited within the parent phase, which is the $\beta$ phase). An equiaxed $\alpha$ structure does not have anisotropy with respect to the shape of the $\alpha$ phase (i.e., the $\alpha$ phase has an isotropic shape), whereas an acicular $\alpha$ structure has anisotropy with respect to the shape of the $\alpha$ phase. In other words, an equiaxed $\alpha$ structure is a structure that is composed of crystals which do not have anisotropy, i.e., crystals whose periodic structure does not change depending on the direction. On the other hand, the crystals composing an acicular $\alpha$ structure have anisotropy, such that their periodic structures change depending on the direction. In other words, when an acicular $\alpha$ structure is observed from different directions, its structure will appear as changing.

In the case where a connecting rod is formed through forging by using an $\alpha+\beta$ type titanium alloy, generally speaking, the structure of the titanium alloy is rendered into an equiaxed $\alpha$ structure by performing a plastic processing at a temperature which is lower than the $\beta$ transformation point. Since an equiaxed $\alpha$ structure has a high fatigue strength, a connecting rod with an improved resistance to fatigue failure is obtained when the $\alpha+\beta$ type titanium alloy has an equiaxed $\alpha$ structure. However, when the $\alpha+\beta$ type titanium alloy has an equiaxed $\alpha$ structure, its large elongation will necessitate a large energy when performing a fracture split, and the fractured surfaces will undergo plastic deformation, thus resulting in a significant deterioration in reassemblability.

On the other hand, when the structure of a titanium alloy is rendered into an acicular $\alpha$ structure by performing a plastic processing at a temperature equal to or higher than the $\beta$ transformation point, the energy which is required for a fracture split can be reduced because an acicular $\alpha$ structure has a smaller elongation than does an equiaxed $\alpha$ structure. Moreover, the plastic deformation of the fractured surfaces can be reduced, and thus a good reassemblability can be obtained. However, since an acicular $\alpha$ structure has a lower fatigue strength than that of an equiaxed $\alpha$ structure, the connecting rod will have a lower resistance to fatigue failure.

As discussed above, as a material of a fracture split-type connecting rod, the equiaxed $\alpha$ structure and the acicular a structure of an $\alpha+\beta$ type titanium alloy each have their strengths and weaknesses in characteristics, thus making it difficult to reconcile an ease of fracture split and a good reassemblability.

Hereinafter, preferred embodiments of the present invention will be described with reference to the figures. Note that the present invention is not to be limited to the preferred embodiments described below.

Figure 2:
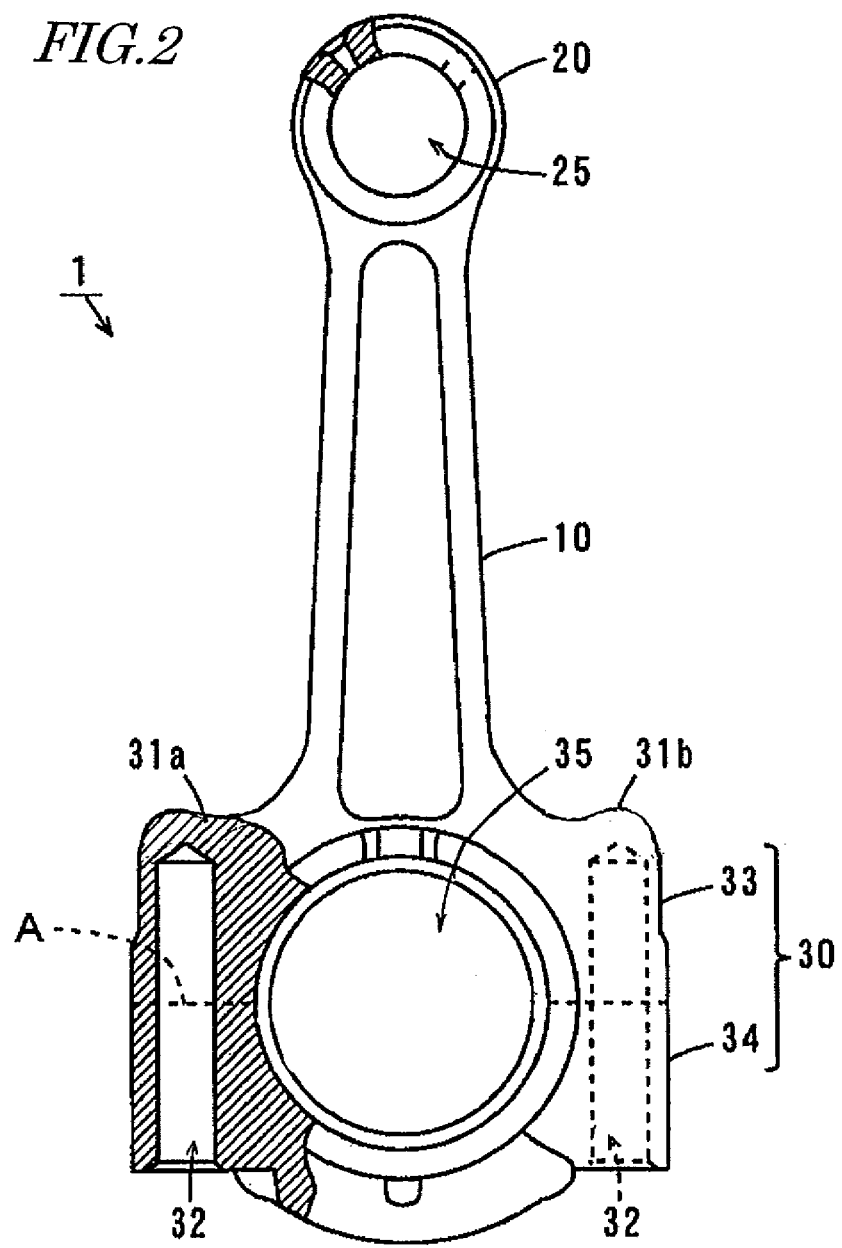
FIG. 2 is a front view which schematically shows a connecting rod according to a preferred embodiment of the present invention before undergoing a fracture split.

FIGS. 1 and 2 show a connecting rod 1 made of a titanium alloy according to the present preferred embodiment. FIGS. 1 and 2 are a perspective view and a plan view, respectively, which schematically show the connecting rod 1 before undergoing a fracture split.

As shown in FIGS. 1 and 2, the connecting rod 1 includes a rod main body 10, a big end 30 which is provided at one end of the rod main body 10, and a small end 20 which is provided at the other end of the rod main body 10.

The small end 20 has a throughhole (called a "piston pin hole") 25 for allowing a piston pin to extend therethrough. On the other hand, the big end 30 has a throughhole (called a "crankpin hole") 35 for allowing a crankpin to extend therethrough. The crankpin hole 35 typically has a larger diameter than that of the piston pin hole 25.

The big end 30 has shoulders 31a and 31b extending from the rod main body 10 toward both lateral sides. Bolt holes 32, through which bolts are to be inserted, are formed in the shoulders 31a and 31b of the big end 30. In the present preferred embodiment, the bolt holes 32 extend from the cap portion 34 toward the rod portion 33, and are each a bottomed hole having a bottom surface inside the rod portion 33.

In the following descriptions, the direction in which the rod main body 10 extends will be referred to as the "longitudinal direction", and the direction of a center axis (shown by a dash line in FIG. 1) of the crankpin hole 35 will be referred to as the "axial direction". Moreover, a direction which is orthogonal to the longitudinal direction and the axial direction will be referred to as the "width direction". In FIG. 1 and the ensuing figures, the longitudinal direction is shown by arrow Z; the axial direction is shown by arrow X; and the width direction is shown by arrow Y.

In the big end 30 before undergoing a fracture split, as shown in FIGS. 1 and 2, the rod portion 33 and the cap portion 34 are integrally formed. The big end 30 is to be fracture-split along an intended fracture surface A, which is parallel to the axial direction X and the width direction Y (i.e., perpendicular to the longitudinal direction Z). The intended fracture surface A is prescribed so as to extend through the center axis of the crankpin hole 35.

Figure 3:
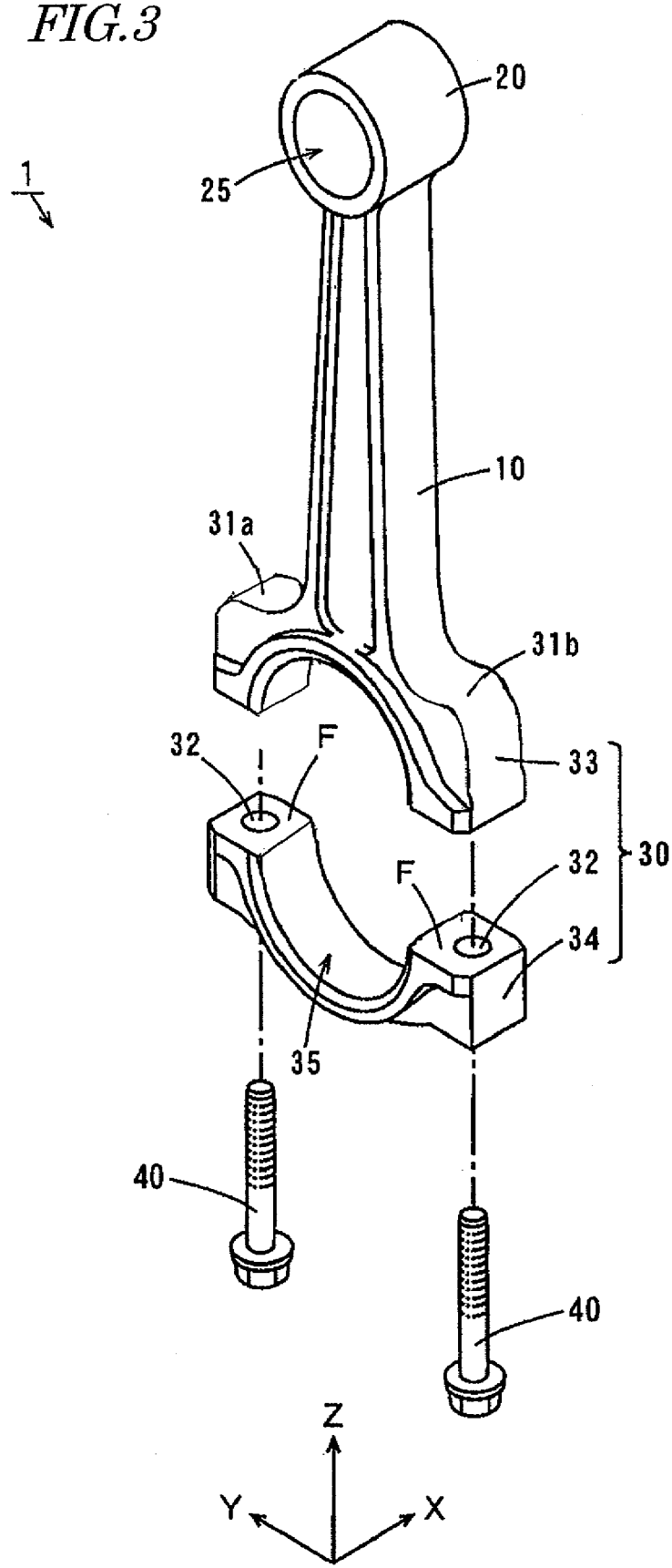
FIG. 3 is a perspective view which schematically shows a connecting rod according to a preferred embodiment of the present invention after undergoing a fracture split.

FIG. 3 shows the connecting rod 1 after undergoing a fracture split. The big end 30 of the connecting rod 1 has been split into the rod portion 33, which continues to one end of the rod main body 10, and the cap portion 34, which is coupled to the rod portion 33 via connecting members (which herein are exemplified as bolts 40).

Through a fracture split, the rod portion 33 and the cap portion 34 each acquire a fractured surface F, on which minute rugged features are present. By allowing the fractured surface F of the rod portion 33 and the fractured surface F of the cap portion 34 to abut with each other, and screwing the bolts 40 into the bolt holes 32, the rod portion 33 and the cap portion 34 are coupled to each other. Complementary rugged features are present on the fractured surfaces F of the rod portion 33 and the cap portion 34, thus enabling accurate positioning of the rod portion 33 and the cap portion 34. As the ruggednesses on the fractured surfaces F fit one another, the rod portion 33 and the cap portion 34 are more firmly coupled to each other, whereby the rigidity of the entire big end 30 is improved.

The fracture split-type connecting rod 1 of the present preferred embodiment is made of an α+β type titanium alloy. The structure of the rod main body 10 is an equiaxed α structure, and the structure of the big end 30 is an acicular α structure. In other words, in the connecting rod 1 of the present preferred embodiment, the rod main body 10 and the big end 30 have respectively different metallographical structures (microstructures).

Generally, the mechanical characteristics required of a connecting rod will differ from region to region. For example, the rod main body is required to have a high fatigue strength so as not to experience a fatigue failure during use. On the other hand, the big end is required to have a high rigidity, rather than having a high fatigue strength, so as not to be deformed even during a high-speed operation.

In the connecting rod 1 of the present preferred embodiment, the structure of the big end 30 is an acicular α structure, which has a smaller elongation than does an equiaxed α structure. Therefore, the energy required when carrying out a fracture split can be reduced, whereby the fracture split is facilitated. Moreover, plastic deformation of the fractured surfaces F can be alleviated, thereby enhancing the reproducibility of roundness (reassemblability) of the inner diameter of the big end 30 when being attached to a crankshaft.

Moreover, in the connecting rod 1 of the present preferred embodiment, the structure of the rod main body 10 is an equiaxed α structure, which has a higher fatigue strength than that of an acicular α structure. Therefore, the fatigue strength of the rod main body 10 can be sufficiently enhanced, so that the resistance to fatigue failure of the entire connecting rod 1 can be maintained sufficiently high.

As described above, in the connecting rod 1 of the present preferred embodiment, a high fatigue strength is ensured because the structure of the rod main body 10 is an equiaxed α structure, and ease of fracture split and high reassemblability are realized because the structure of the big end 30 is an acicular α structure.

When the big end 30 has a high reassemblability, the roundness of the big end 30 during operation of the internal combustion engine is improved, whereby an improved anti-sticking property is obtained. This results in less severe rigidity requirements for the big end 30, which makes possible a weight reduction by decreasing the thickness of the big end 30. When the weight of the connecting rod 1 is reduced, it becomes possible to reduce the weights of a crankshaft, a balancer, a case, and so on, which enables reduction in the weight of the entire internal combustion engine and hence the entire transportation apparatus.

Note that it is not necessary that the entire big end 30 has an acicular α structure. It is the structure of the fractured surfaces F that affects the ease of fracture split and the level of reassemblability. Therefore, so long as the structure of at least the fractured surfaces F is an acicular α structure, fracture split can be facilitated and a high reassemblability can be obtained.

With respect to an α+β type titanium alloy having a composition and a β transformation point as shown in Table 1 below, FIG. 4 shows a relationship between microstructure types, fatigue strength (MPa), and elongation (%). FIGS. 5A to 5C show photographs of microstructures of this α+β type titanium alloy. In FIGS. 5A to 5C, white portions are the α phase, whereas black portions are the β phase.

TABLE 1

| composition (mass %) | | | β transformation |
|---|---|---|---|
| Al | V | Ti | point |
| 6.2 | 3.9 | Balance | 995° C. |

From FIG. 4, it can be seen that the equiaxed α structures shown in FIGS. 5B and 5C (which are conveniently denoted as "equiaxed α structure 1" and "equiaxed α structure 2" in the figures) have higher fatigue strengths and larger elongations than those of the acicular α structure shown in FIG. 5A.

Moreover, with respect to an α+β type titanium alloy having a composition and a β transformation point as shown in Table 2, FIG. 6 shows a relationship between microstructure types, fatigue strength (MPa), and elongation (%). FIGS. 7A to 7C show photographs of microstructures of this α+β type titanium alloy. Also in FIGS. 7A to 7C, white portions are the α phase, whereas black portions are the β phase.

TABLE 2

| composition (mass %) | | | β transformation |
|---|---|---|---|
| Al | Fe | Ti | point |
| 5.2 | 1.1 | Balance | 1000° C. |

From FIG. 6, it can be seen that the equiaxed α structure shown in FIG. 7C has a higher fatigue strength and a larger elongation than those of the acicular α structures shown in FIGS. 7A and 7B (which are conveniently denoted as "acicular α structure 1" and "acicular α structure 2" in the figures).

Figure 8:
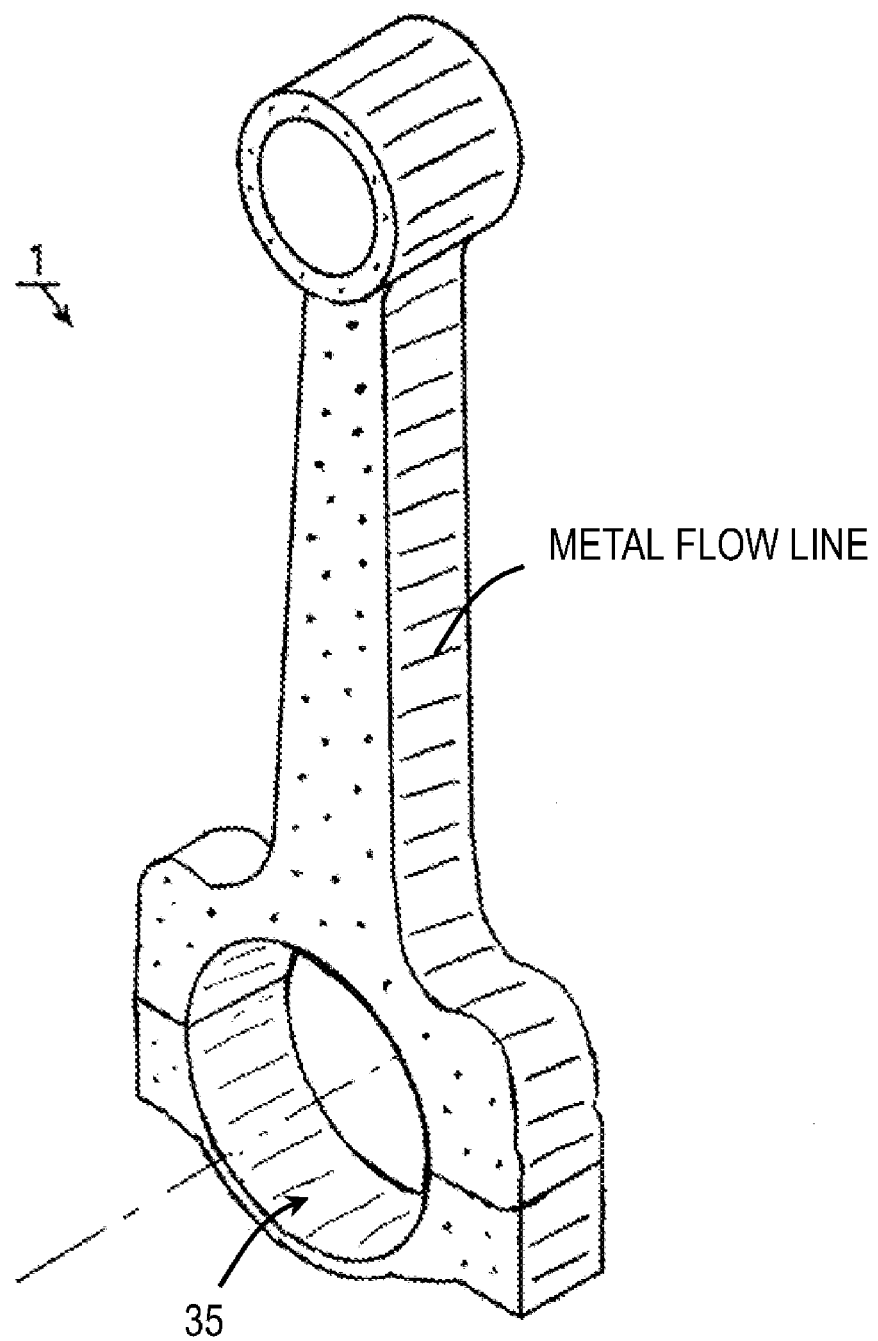
FIG. 8 is a diagram schematically showing metal flow lines of a connecting rod according to a preferred embodiment of the present invention.

Note that, from the standpoint of further facilitating the fracture split of the big end 30, as shown in FIG. 8, it is preferable that the metal flow lines of the connecting rod 1 are generally parallel to the center axis of the crankpin hole 35 (i.e., parallel to the axial direction X) at least near the fractured surfaces F of the big end 30. By orienting the metal flow lines in this direction, the fracture split will occur in a direction not traversing the metal flow lines, thus facilitating the fracture split of the big end 30.

Figure 14:
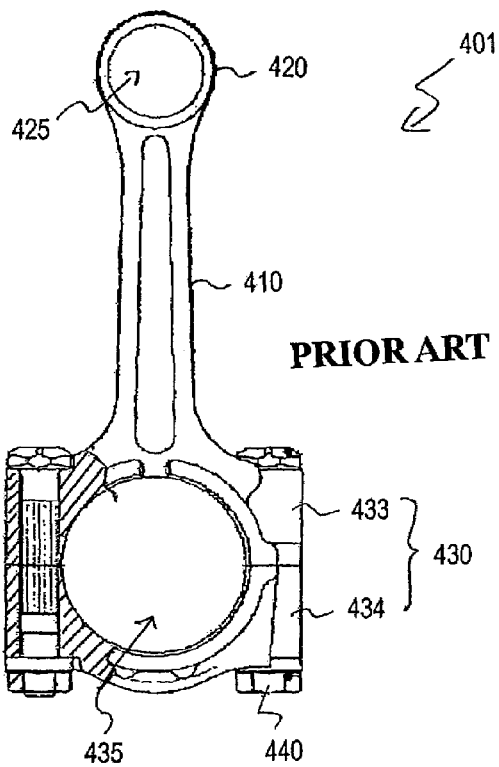
FIG. 14 is a front view schematically showing a conventional split-type connecting rod.
Figure 15:
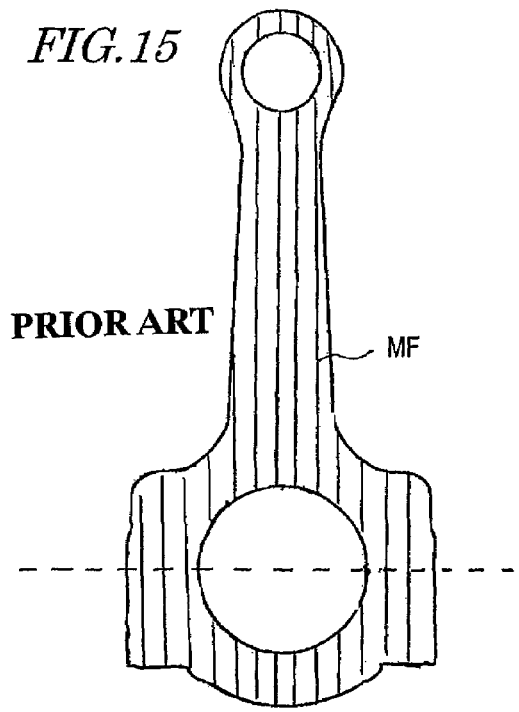
FIG. 15 is a diagram schematically showing metal flow lines of a conventional connecting rod.
Figure 16:
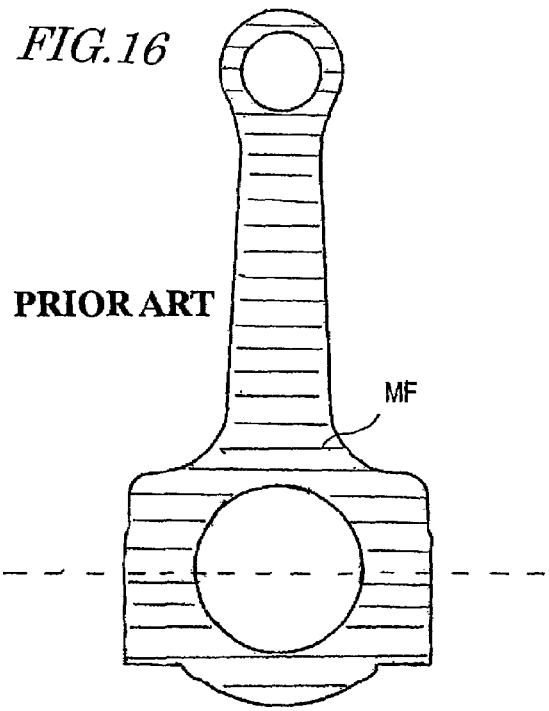
FIG. 16 is a diagram schematically showing metal flow lines of a connecting rod which is disclosed in Japanese Laid-Open Patent Publication No. 9-182932.

Moreover, in the present preferred embodiment, the bolt holes 32 are bottomed holes, as illustrated in FIG. 2. By adopting such a structure, the rigidity of the rod portion 33 can be improved as compared to the case where throughholes penetrating the rod portion are formed as bolt holes (shown in FIG. 14). When throughholes are formed as bolt holes, rigidity may be achieved by making the rod portion thick, but the weight of the connecting rod will increase in this case. In contrast, when the bolt holes 32 are bottomed holes, it is possible to reduce the weight of the connecting rod 1 while ensuring rigidity of the rod portion 33.

Next, a production method for the fracture split-type connecting rod 1 of the present preferred embodiment will be described. For ease of understanding, Table 3 below shows a temperature at which the workpiece is maintained in each main step, and a structure of the titanium alloy after that step.

TABLE 3

| step | | temperature | structure |
|---|---|---|---|
| preparation of workpiece of α + β type titanium alloy | | — | — |
| plastic processing at β transformation point or higher temperature | forging | β transformation point or higher | acicular α |
| | extrusion | β transformation point or higher | acicular α |
| | cutting | — | acicular α |
| forging at a temperature below β transformation point | die forging | below β transformation point | rod main body: equiaxed α big end: acicular α |

First, a workpiece which is made of an α+β type titanium alloy is provided. For example, an ingot which is formed by subjecting a melt of an α+β type titanium alloy to smelting is provided. The α+β type titanium alloy may be of various compositions; for example, α+β type titanium alloys of the compositions shown in Table 1 and Table 2 can be used.

Figure 9A:
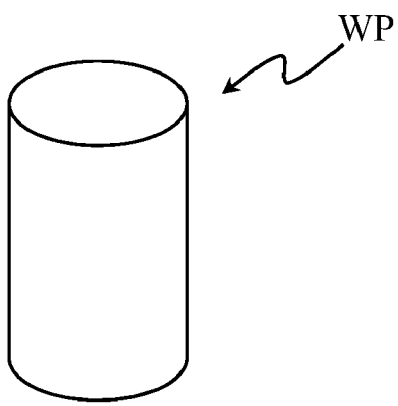
FIGS. 9A to 9D are diagrams schematically showing a workpiece during production of a connecting rod according to a preferred embodiment of the present invention.
Figure 9B:
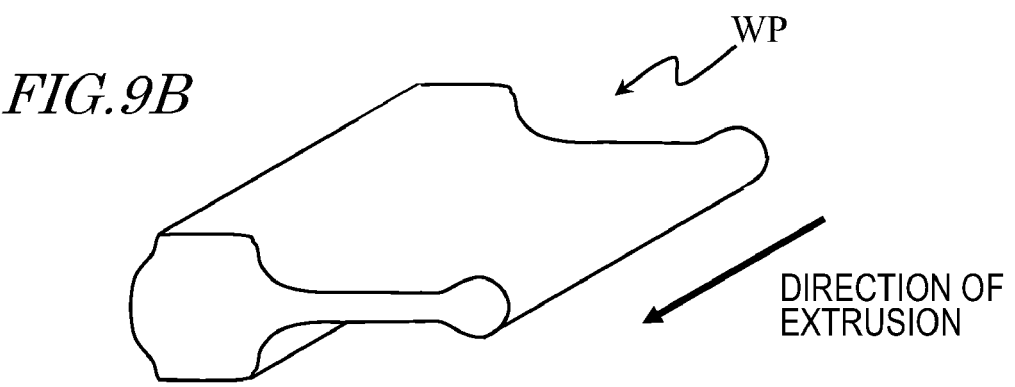

Next, the workpiece is subjected to plastic processing while being maintained at a temperature equal to or higher than the β transformation point. Specifically, as shown in FIG. 9A, a workpiece WP is first subjected to forging (e.g. open-die forging) so as to be molded into the shape of a cylindrical bar. Since this step is performed at a temperature equal to or higher than the β transformation point, the structure of the workpiece WP in the shape of a cylindrical bar is an acicular α structure. Next, as shown in FIG. 9B, the workpiece WP in the shape of a cylindrical bar is extruded. This step is also performed at a temperature equal to or higher than the β transformation point, and therefore the structure of the workpiece (extrusion bar) WP after extrusion continues to be an acicular α structure. Moreover, in this step, the workpiece WP is molded in such a manner that its outer peripheral shape as seen from the direction of extrusion is generally identical to the outer peripheral shape of the workpiece WP having been forged in the die forging step described later.

Figure 9C:
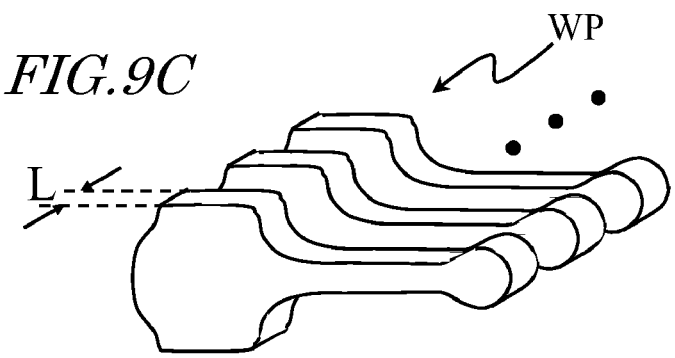

Next, as shown in FIG. 9C, the extruded workpiece WP is cut to a predetermined thickness L. Cutting of the workpiece WP is performed so as to result in a cutting plane which is generally perpendicular to the direction of extrusion in the extrusion step.

Figure 9D:
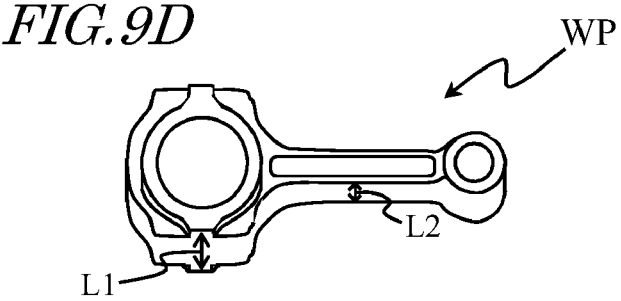

Next, as shown in FIG. 9D, the workpiece WP is subjected to forging at a temperature below the β transformation point. Specifically, a die forging is performed in such a manner that the forging ratio of a portion corresponding to the rod main body 10 is equal to or greater than 2 and that the forging ratio of a portion corresponding to the big end 30 is less than 2. As used herein, a "forging ratio" is a ratio of the thickness of the workpiece WP before forging (which in the present preferred embodiment is a cutting thickness L during the cutting step) to the thickness after forging. Therefore, the forging ratio of the portion corresponding to the big end 30 can be determined by dividing the thickness L before forging by a thickness L1 of the portion corresponding to the big end 30 after forging. Similarly, the forging ratio of the portion corresponding to the rod main body 10 can be determined by dividing the thickness L before forging by a thickness L2 of the portion corresponding to the rod main body 10 after forging. Since this step is performed at a temperature below the β transformation point, the structure of the portion with a high forging ratio (specifically, the portion which is equal to or greater than 2) is an equiaxed α structure, whereas the structure of the portion with a low forging ratio (specifically, the portion which is less than 2) remains as an acicular α structure. In other words, the structure of the portion corresponding to the rod main body 10 becomes an equiaxed α structure, whereas the structure of the portion corresponding to the big end 30 remains as an acicular α structure.

Next, the workpiece WP is subjected to a machining and a heat treatment. Through the machining, the piston pin hole 25 is formed in the portion corresponding to the small end 20, and the crankpin hole 35 is formed in the portion corresponding to the big end 30. Moreover, on the inner peripheral surface of the crankpin hole 35, a fracture beginning trench (not shown) which extends along the axial direction X is formed. As the heat treatment, for example, an annealing treatment, a solution treatment, and an aging treatment are consecutively performed. In this manner, the connecting rod 1 as shown in FIG. 1 and FIG. 2 is obtained.

Figure 10:
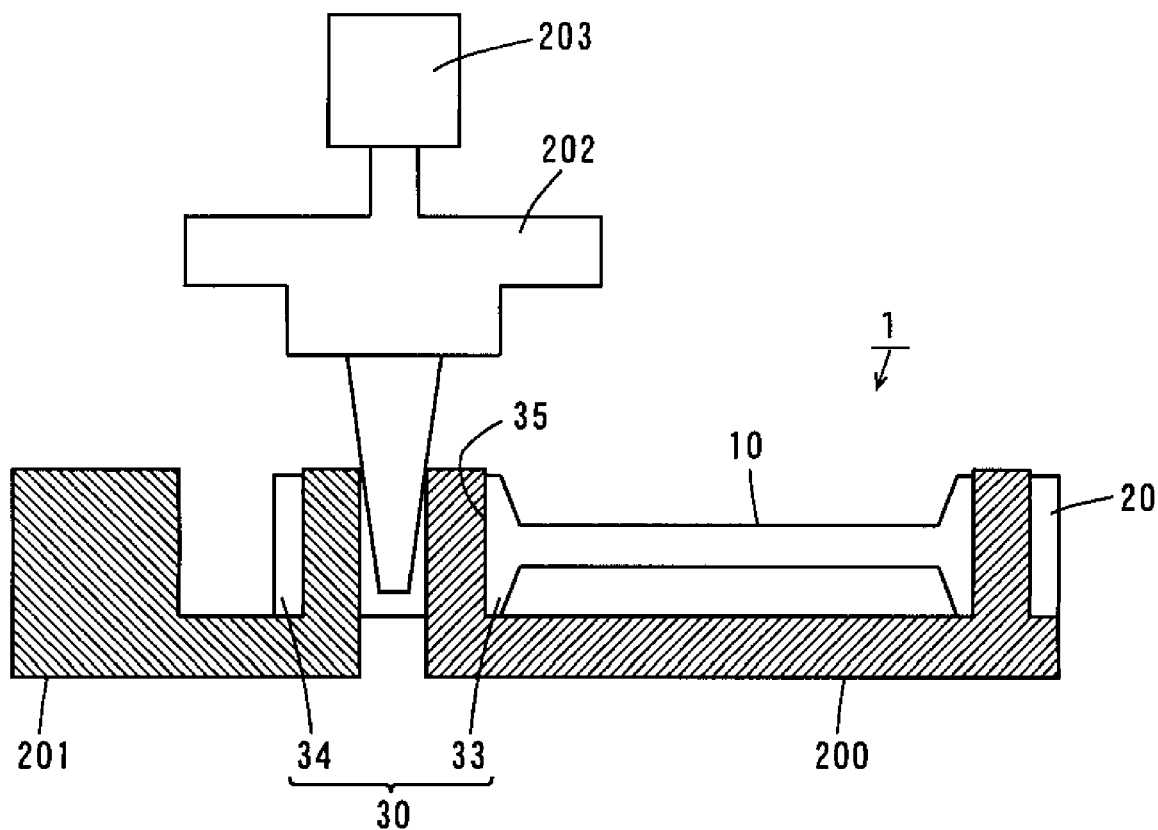
FIG. 10 is a cross-sectional view showing an example of a fracture split technique.

Next, the big end 30 of the connecting rod 1 is fracture split into the rod portion 33 and the cap portion 34. FIG. 10 shows an example of a fracture split technique. As shown in FIG. 10, protrusions of sliders 200 and 201 which are capable of moving along the horizontal direction are inserted in the crankpin hole 35 of the big end 30 of the connecting rod 1, and a wedge 202 is driven in between the protrusions of the sliders 200 and 201 by using a weight 203. As a result, beginning from fracture beginning trenches, the big end 30 of the connecting rod 1 is fracture-split along the intended fracture surface A, thus being divided into the rod portion 33 and the cap portion 34.

Note that, before performing the step of fracture-splitting the big end 30, it is preferable to cool the big end 30 below a predetermined temperature (e.g., about −40° C. or below) in advance. The cooling of the big end 30 can be performed by soaking the connecting rod 1 into liquid nitrogen, for example. By performing such a cooling step before the fracture split step, the fracture split of the connecting rod 1 made of a titanium alloy can be facilitated. Conventionally, such a cooling step has occasionally been performed for a fracture split-type connecting rod which is made of steel. The reason is that, in the case of a steel connecting rod, the mode of fracturing under an applied load changes from ductile fracture to brittle fracture at a temperature (called "ductile-brittle transition temperature") which is room temperature or below, and thus a cooling step is known to facilitate its fracture split. However, a titanium alloy has a ductile-brittle transition temperature above room temperature. Although this fact would appear to destroy the significance of performing a cooling step, the inventors have nonetheless attempted a cooling step, without being preoccupied with such technological common knowledge. As a result, the inventors have experimentally confirmed that fracture split of a connecting rod of a titanium alloy is also facilitated by a cooling step. The presumable reason for the facilitated fracture split is the lowering, even if little, of toughness.

The fracture split-type connecting rod 1 is completed in the above-described manner. As already described above, in the production method according to the present preferred embodiment, the work piece WP is first subjected to plastic processing (forging into a bar and extrusion) while being maintained at a temperature equal to or higher than the β transformation point, thus temporarily converting the structure of the entire workpiece WP to an acicular α structure. Then, at a temperature below the β transformation point, the workpiece WP is subjected to forging in such a manner that the portion corresponding to the rod main body 10 has a forging ratio which is equal to or greater than 2 and that the portion corresponding to the big end 30 has a forging ratio which is less than 2, thus selectively converting the structure of the portion corresponding to the rod main body 10 into an equiaxed α structure, while the structure of the portion corresponding to the big end 30 remains as an acicular α structure. As a result, the connecting rod 1 having respectively different metallographical structures in its rod main body 10 and big end 30 can be produced.

By using an α+β type titanium alloy having the composition shown in Table 2, a connecting rod 1 was actually produced under the following conditions: the thickness L before die forging was 18 mm; the thickness L1 of the portion corresponding to the big end 30 after die forging was 23 mm; and the thickness L2 of the portion corresponding to the rod main body 10 after die forging was 8 mm. It was confirmed that the structure of the rod main body 10 was an equiaxed α structure as shown in FIG. 7C and that the structure of the big end 30 was an acicular α structure as shown in FIG. 7A. Under the aforementioned conditions, the forging ratio of the portion corresponding to the rod main body 10 is 2.25 (=18/8), and the forging ratio of the portion corresponding to the big end 30 is about 0.8 (=18/23).

It will be appreciated that the forging ratio of the portion corresponding to the rod main body 10 and the forging ratio of the portion corresponding to the big end 30 are not limited to the values exemplified herein. It suffices if the forging ratio of the portion corresponding to the rod main body 10 is equal to or greater than 2, and it suffices if the forging ratio of the portion corresponding to the big end 30 is less than 2. However, from the standpoint of more surely maintaining the structure of the portion corresponding to the big end 30 as an acicular α structure, it is preferable that the forging ratio of the portion corresponding to the big end 30 is about 1.0 or less, for example.

Note that, as has already been described, in order to facilitate fracture split and obtain a high reassemblability, it is not necessary that the entire big end 30 has an acicular α structure, but it suffices if the structure of at least the fractured surfaces F is an acicular α structure. Therefore, in the forging step which is performed at a temperature below the β transformation point, it is not necessary to set the forging ratio to less than about 2 throughout the portion corresponding to the entire big end 30, but it suffices if the forging ratio of the portion corresponding to at least the neighborhood of the fractured surfaces F is less than about 2.

Although the present preferred embodiment illustrates an example where forging into a bar and extrusion are performed before the forging (die forging) at a temperature below the β transformation point, the plastic processing which is performed at a temperature equal to or higher than the β transformation point is not limited thereto. Moreover, it is not even necessary to perform plastic processing at a temperature equal to or higher than the β transformation point. By temporarily maintaining the workpiece WP at a temperature equal to or higher than the β transformation point, it can be ensured that the structure of the workpiece WP is an acicular α structure.

However, in order to ensure that the portion corresponding to the big end 30 has a forging ratio which is less than 2, it is preferable that the portion corresponding to the big end 30 is molded as closely to a final shape as possible prior to the forging (die forging) at a temperature below the β transformation point. By performing plastic processing while maintaining the workpiece WP at a temperature equal to or higher than the β transformation point, it becomes possible to mold the portion corresponding to the big end 30 closely to a final shape. For example, as in the present preferred embodiment, by extruding the workpiece WP in such a manner that its outer peripheral shape as seen from the direction of extrusion is generally identical to the outer peripheral shape of the workpiece WP after die forging, the deformation of the portion corresponding to the big end 30 during die forging is reduced, and the forging ratio of the portion corresponding to the big end 30 can be made sufficiently small.

The forging ratio can be easily set by adjusting the cutting thickness L in the step of cutting the extruded workpiece WP. By setting the cutting thickness L to be no less than twice the thickness L1 of the portion corresponding to the rod main body 10 after die forging but less than twice the thickness L2 of the portion corresponding to the big end 30, it can be ensured that the forging ratio is equal to or greater than 2 in the portion corresponding to the rod main body 10 and less than 2 in the portion corresponding to the big end 30.

Moreover, since the metal flow lines will be formed so as to follow along the direction of deformation during the plastic processing, the plastic processing at a temperature equal to or higher than the β transformation point and the forging at a temperature below the β transformation point are preferably performed in a manner of taking into account the direction of the metal flow lines. In the production method exemplified in the present preferred embodiment, the metal flow lines preferably run generally parallel to the direction of extrusion during the extrusion. The workpiece (extrusion bar) WP having been extruded is thereafter cut in such a manner as to result in a cutting plane which is preferably generally perpendicular to the direction of extrusion, and the workpiece WP after being cut is subjected to a forging such that the cutting plane is generally perpendicular to the direction of forging (i.e., the direction of pressurization). Therefore, with the production method exemplified in the present preferred embodiment, the metal flow lines can be made generally parallel to the axial direction X, as shown in FIG. 8.

Figure 11:
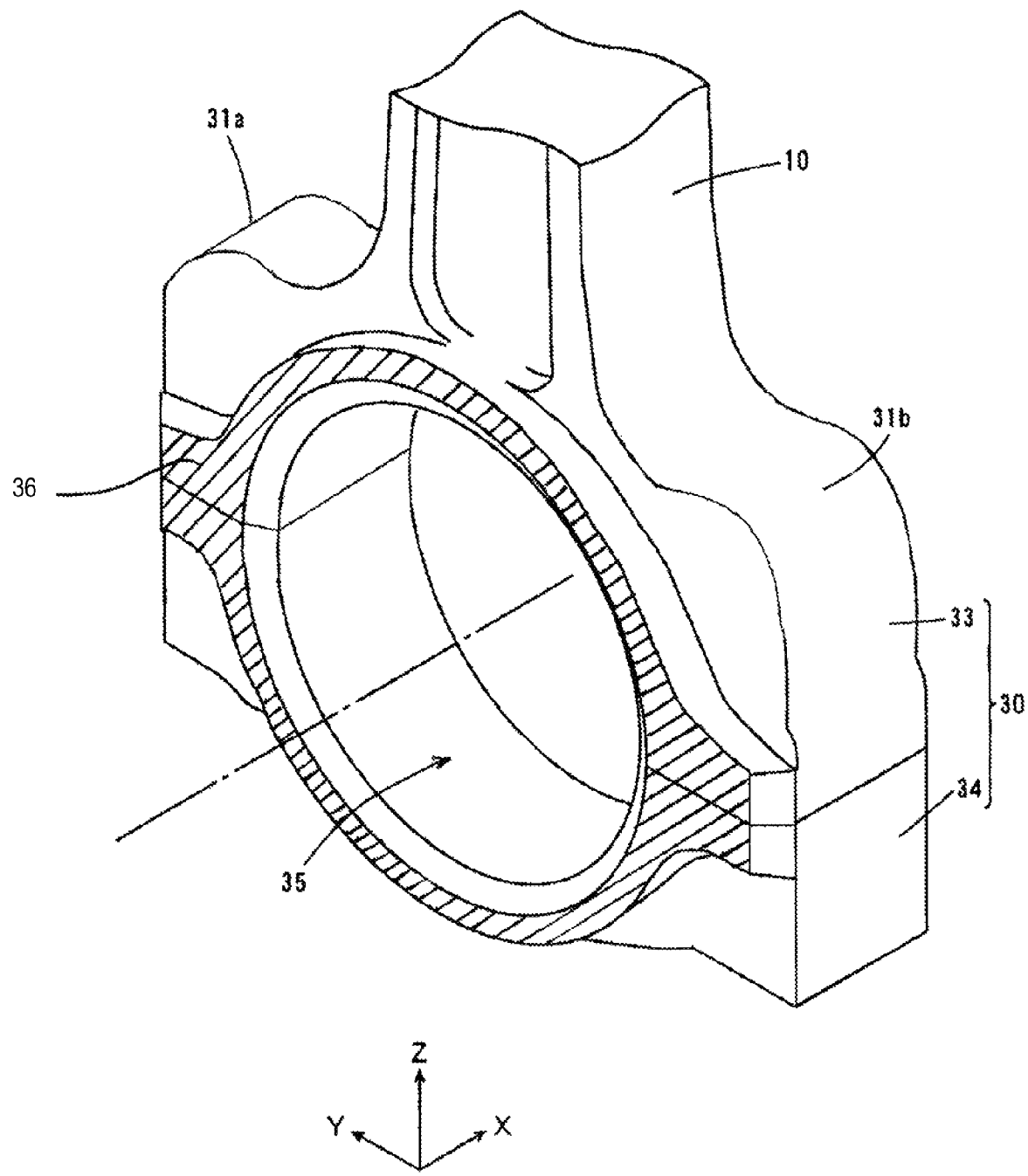
FIG. 11 is a perspective view showing enlarged the neighborhood of a big end of a connecting rod according to a preferred embodiment of the present invention.

Moreover, as shown in FIG. 11, the big end 30 of the connecting rod 1 has a thrust surface 36 which comes in sliding contact with a crank arm. In FIG. 11, the thrust surface 36 is shown hatched for clarity. The thrust surface 36 is a surface that extends generally perpendicularly to the axial direction X, and is located on the outermost portion of the connecting rod 1 along the axial direction X. Therefore, it is at the thrust surface 36 that the connecting rod 1 has a largest thickness (thickness along the axial direction X). For this reason, as shown in FIG. 11, the width (along the radial direction of the crankpin hole 35) of the thrust surface 36 may be made largest (i.e. broader than any other portion) near the fractured surfaces F, whereby the deformation of the portion corresponding to the neighborhood of the fractured surfaces F during the die forging can be reduced, thus making it easy to reduce the forging ratio of the portion corresponding to the neighborhood of the fractured surfaces F.

Note that the connecting rod 1 of the present preferred embodiment can also be produced by methods other than the above-described production method. For example, the entire plastic processing, including die forging, may be performed at a temperature below the β transformation point, thus ending the plastic processing when the structure of the entire workpiece WP has become an equiaxed α structure; thereafter, the portion corresponding to the big end 30 may be selectively heated to be maintained at a temperature equal to or higher than the β transformation point, thus allowing the structure of the portion corresponding to the big end 30 to be selectively converted to an acicular α structure. Of course, it suffices if the structure of at least the neighborhood of the fractured surfaces F is an acicular α structure, as has been described above, and therefore the selective heating may be performed only for the portion corresponding to the neighborhood of the fractured surfaces F. As the technique of selective heating, a high-frequency heating technique may be used, for example.

Figure 12:
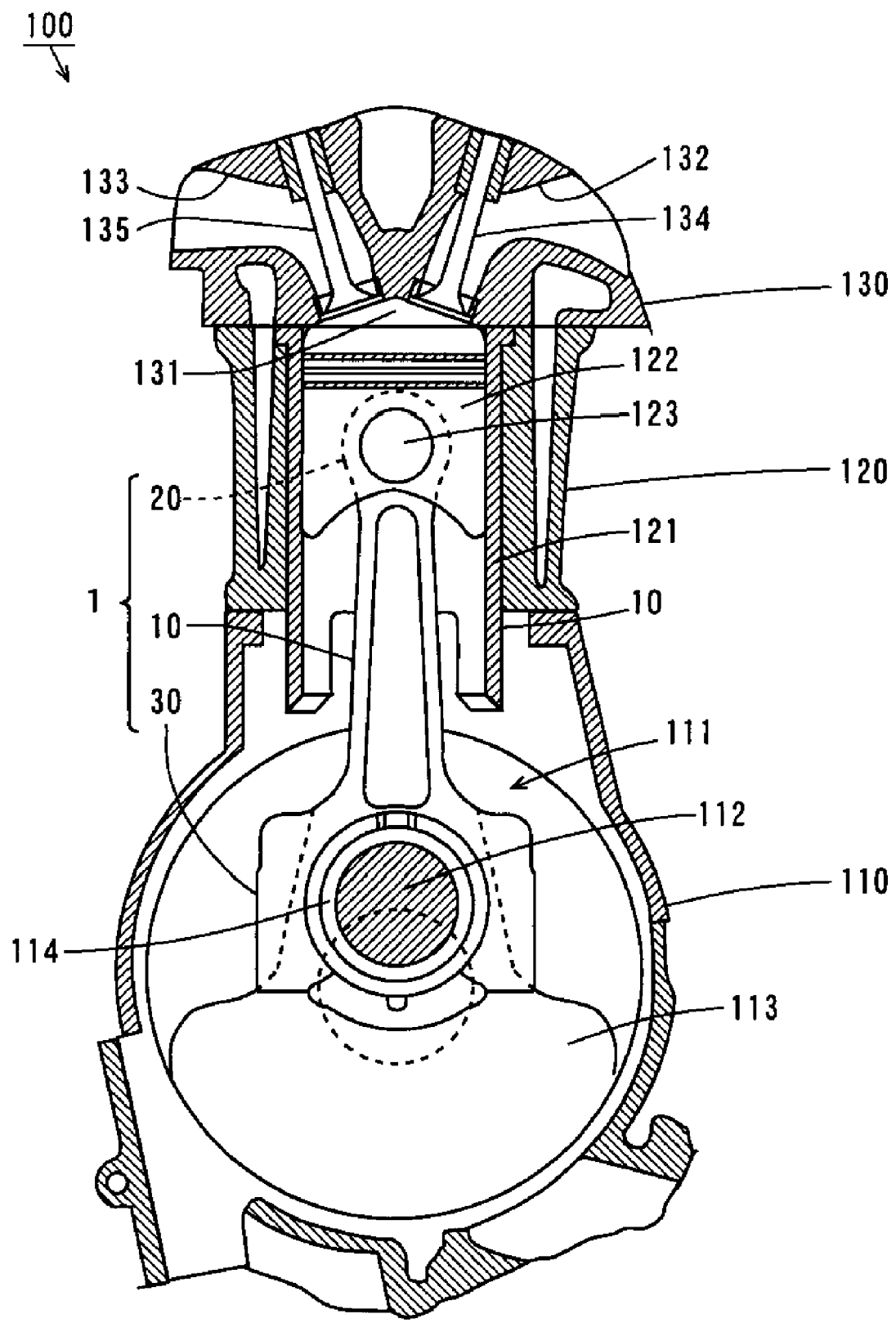
FIG. 12 is a cross-sectional view schematically showing an example of an engine which incorporates a connecting rod according to a preferred embodiment of the present invention.

The connecting rod according to the present preferred embodiment can be broadly used in various types of internal combustion engines (engines) which are intended for transportation apparatus or other mechanical applications. FIG. 12 shows an example of an engine 100 which incorporates the connecting rod 1 produced by the production method of the present preferred embodiment.

The engine 100 includes a crankcase 110, a cylinder block 120, and a cylinder head 130.

A crankshaft 111 is accommodated in the crankcase 110. The crankshaft 111 has a crankpin 112 and a crank arm 113.

A cylinder block 120 is provided above the crankcase 110. A cylinder sleeve 121 having a cylindrical shape is fitted within the cylinder block 120, such that a piston 122 is allowed to reciprocate inside the cylinder sleeve 121.

A cylinder head 130 is provided above the cylinder block 120. In conjunction with the piston 122 and the cylinder sleeve 121 in the cylinder block 120, the cylinder head 130 define a combustion chamber 131. The cylinder head 130 has an intake port 132 and an exhaust port 133. An intake valve 134 for supplying vapor to the interior of the combustion chamber 131 is provided within the intake port 132, and an exhaust valve 135 for enabling evacuation of the combustion chamber 131 is provided within the exhaust port 133.

The piston 122 and the crankshaft 111 are linked via the connecting rod 1. Specifically, a piston pin 123 of the piston 122 is inserted in the throughhole (piston pin hole) of the small end 20 of the connecting rod 1, and the crankpin 112 of the crankshaft 111 is inserted in the throughhole (crankpin hole) of the big end 30, thus linking the piston 122 and the crankshaft 111 together. A bearing metal 114 is provided between the inner peripheral surface of the throughhole of the big end 30 and the crankpin 112.

Figure 13:
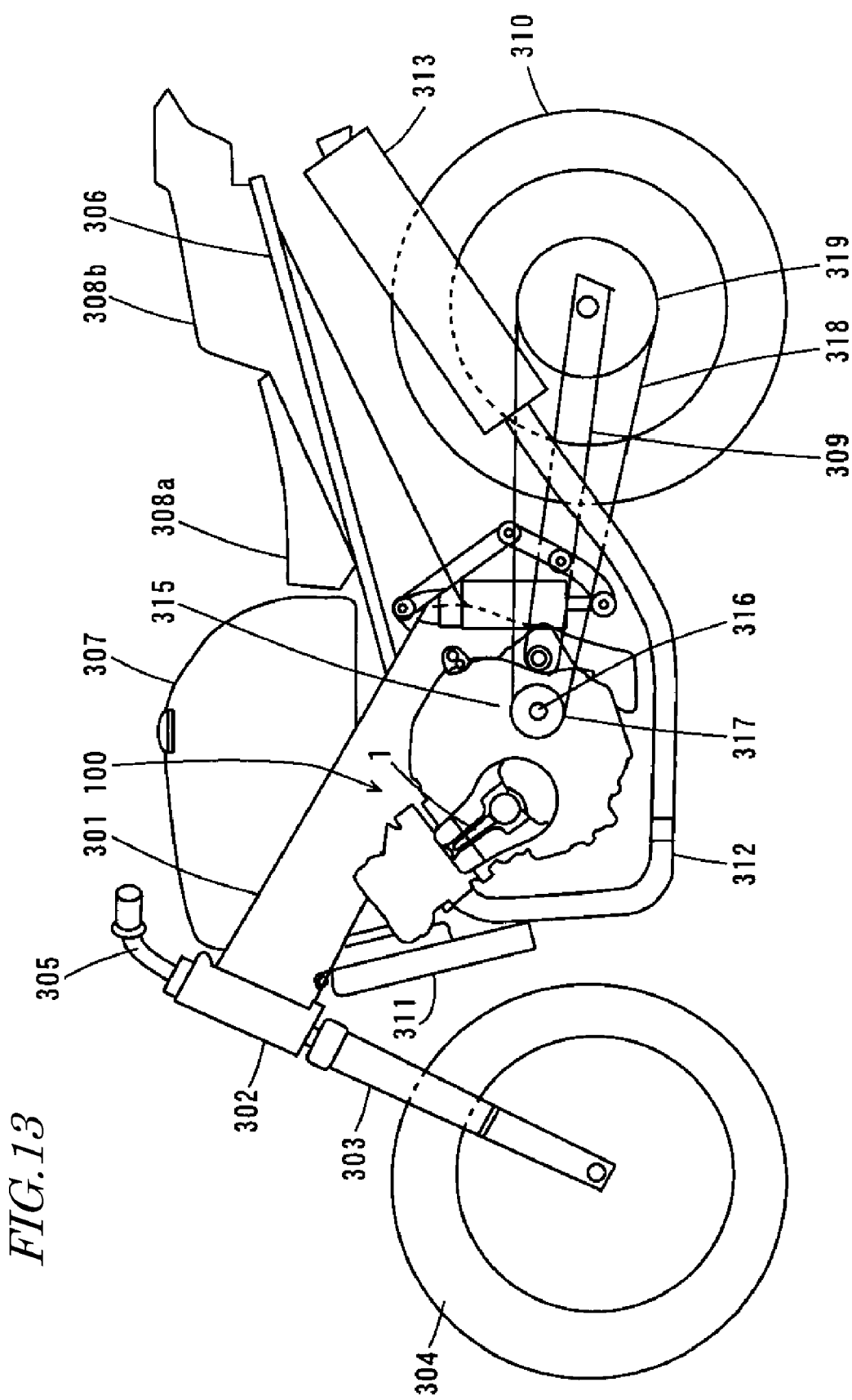
FIG. 13 is a cross-sectional view schematically showing a motorcycle which incorporates the engine shown in FIG. 12.

FIG. 13 shows a motorcycle which incorporates the engine 100 shown in FIG. 12. In the motorcycle shown in FIG. 13, a head pipe 302 is provided at the front end of a body frame 301. To the head pipe 302, a front fork 303 is attached so as to be capable of swinging in the right-left direction of the vehicle. At the lower end of the front fork 303, a front wheel 304 is supported so as to be capable of rotating.

A seat rail 306 is attached at an upper portion of the rear end of the body frame 301 so as to extend in the rear direction. A fuel tank 307 is provided on the body frame 301, and a main seat 308a and a tandem seat 308b are provided on the seat rail 306.

Rear arms 309 extending in the rear direction are attached to the rear end of the body frame 301. At the rear end of the rear arms 309, a rear wheel 310 is supported so as to be capable of rotating.

At the central portion of the body frame 301, the engine 100 shown in FIG. 12 is held. The engine 100 incorporates the connecting rod 1 of the present preferred embodiment. A radiator 311 is provided in front of the engine 100. An exhaust pipe 312 is connected to an exhaust port of the engine 100, and a muffler 313 is attached to the rear end of the exhaust pipe 312.

A transmission 315 is linked to the engine 100. Driving sprockets 317 are attached on an output axis 316 of the transmission 315. Via a chain 318, the driving sprockets 317 are linked to rear wheel sprockets 319 of the rear wheel 310. The transmission 315 and the chain 318 function as a transmitting mechanism for transmitting the motive power generated in the engine 100 to the driving wheel.

In the connecting rod 1 of the present preferred embodiment, the inner diameter of the big end 30 has a high reproducibility of roundness (reassemblability) upon attachment to the crankshaft 111. Therefore, the big end 30 has an improved roundness during the operation of the engine 100, thus providing an improved anti-sticking property. This results in less severe rigidity requirements for the big end 30, which makes possible a weight reduction by decreasing the thickness of the big end 30. When the weight of the connecting rod 1 is reduced, it becomes possible to reduce the weights of the crankshaft 111, the balancer, the crankcase 110, and so on, which enables reduction in the weight of the entire engine 100 and hence the entire motorcycle. Moreover, when the weight of connecting rod 1 is reduced, the fuel consumption and output power of the engine 100 can be improved.

According to various preferred embodiments of the present invention, there is provided a fracture split-type connecting rod made of a titanium alloy, which is easily split by a fracture technique and which has an excellent reassemblability, and a production method thereof.

The fracture split-type connecting rod according to various preferred embodiments of the present invention can be broadly used in various types of internal combustion engines (e.g., an engine for a transportation apparatus).

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2007-332243 filed on Dec. 25, 2007, the entire contents of which are hereby incorporated by reference.

What is claimed is:

1. A fracture split connecting rod made of an α+β titanium alloy, comprising:
   a rod main body; and
   a big end provided at an end of the rod main body; wherein
   the big end is fracture split;
   the rod main body has an equiaxed α structure; and
   fractured surfaces of the big end have an acicular α structure.

2. The fracture split connecting rod of claim 1, wherein the big end has a throughhole, and metal flow lines in a vicinity of the fractured surfaces of the big end are substantially parallel to a center axis of the throughhole.

3. The fracture split connecting rod of claim 1, wherein the big end has a thrust surface arranged to make sliding contact with a crank arm, and a width of the thrust surface is broadest in an area of the fractured surfaces.

4. An internal combustion engine comprising:
   the fracture split connecting rod of claim 1.

5. A transportation apparatus comprising: the internal combustion engine of claim 4.

* * * * *